(12) United States Patent
Kreller

(10) Patent No.: US 7,413,365 B2
(45) Date of Patent: Aug. 19, 2008

(54) CONNECTING CONSTRUCTION FOR COMPONENTS OF A SYSTEM FRAME, COUPLING UNIT AND FRAMEWORK

(75) Inventor: Helmut Kreller, Bad Rappenau (DE)

(73) Assignee: Wilhelm Layher Vermogensverwaltungs GmbH, Guglingen-Eibensbach (DE)

( * ) Notice: Subject to any disclaimer, the term of this patent is extended or adjusted under 35 U.S.C. 154(b) by 226 days.

(21) Appl. No.: 10/622,935

(22) Filed: Jul. 18, 2003

(65) Prior Publication Data
US 2004/0020156 A1    Feb. 5, 2004

Related U.S. Application Data

(63) Continuation of application No. PCT/DE02/00567, filed on Feb. 19, 2002.

(30) Foreign Application Priority Data
Feb. 22, 2001    (DE) .............................. 201 03 131 U
Mar. 15, 2001    (DE) ................................. 101 12 372

(51) Int. Cl.
*E04G 1/14*    (2006.01)
*E04G 1/15*    (2006.01)

(52) U.S. Cl. .................... 403/49; 403/233; 403/403; 52/651.01; 52/655.1; 182/178.5

(58) Field of Classification Search ............... 403/169, 403/233, 234, 403, 49, 231; 52/655.1, 651.01; 182/178.5
See application file for complete search history.

(56) References Cited
U.S. PATENT DOCUMENTS
2,658,776 A * 11/1953 Wilcox ....................... 403/300
2,857,026 A    10/1958 Jones
3,266,208 A    8/1966 Maggs et al.
3,315,994 A * 4/1967 Rifken ......................... 403/169
3,915,101 A * 10/1975 Onori .......................... 403/234
4,111,579 A    9/1978 Knight (Continued)

FOREIGN PATENT DOCUMENTS
CH    406 6031 A1    1/1966

(Continued)

*Primary Examiner*—Daniel P. Stodola
*Assistant Examiner*—Ernesto Garcia
(74) *Attorney, Agent, or Firm*—Darby & Darby P.C.

(57) ABSTRACT

A connecting construction for components of a system frame, having frameworks which have frame struts (12) and cross brackets (14) connecting the frame struts (12), a sheet steel corner plate (20) which is arranged in each case in the region in which the cross bracket (14) is connected to the frame strut (12) and which has a corner recess (22) in the corner region of the region in which the cross bracket (14) is connected to the frame strut (12), by means of which a coupling unit can be connected to the frame strut (12), is distinguished in that a further recess (24) is provided approximately level with the corner recess (22) and offset inward, and a further coupling unit having a first coupling element and a second coupling element is provided, it being possible for a frame tube to be connected to the first coupling element, and the second coupling element being designed in such a manner that it can be fastened in the further recess (24) of the sheet steel corner plate (20) with a positive and/or non-positive fit.

9 Claims, 6 Drawing Sheets

U.S. PATENT DOCUMENTS

| | | | |
|---|---|---|---|
| 4,214,841 A * | 7/1980 | Hayashi | 403/188 |
| 4,219,285 A * | 8/1980 | Hayashi | 403/188 |
| 4,430,019 A * | 2/1984 | D'Alessio | 182/178.1 |
| 4,452,337 A | 6/1984 | Atzinger | |
| 4,758,111 A * | 7/1988 | Vitta | 403/176 |
| 4,919,230 A * | 4/1990 | Langer et al. | 182/186.8 |
| 5,468,086 A * | 11/1995 | Goya | 403/169 |
| 5,577,353 A * | 11/1996 | Simpson | 52/655.1 |
| 5,901,810 A * | 5/1999 | Krause | 182/178.5 |
| 5,988,317 A * | 11/1999 | Riding | 182/178.5 |
| 6,076,325 A * | 6/2000 | Sluiter | 52/655.1 |
| 6,443,262 B1 * | 9/2002 | Karanouh | 182/178.5 |

FOREIGN PATENT DOCUMENTS

| | | |
|---|---|---|
| DE | 200 05 629 A1 | 8/2000 |
| SE | 96611 A * | 8/1939 |

* cited by examiner

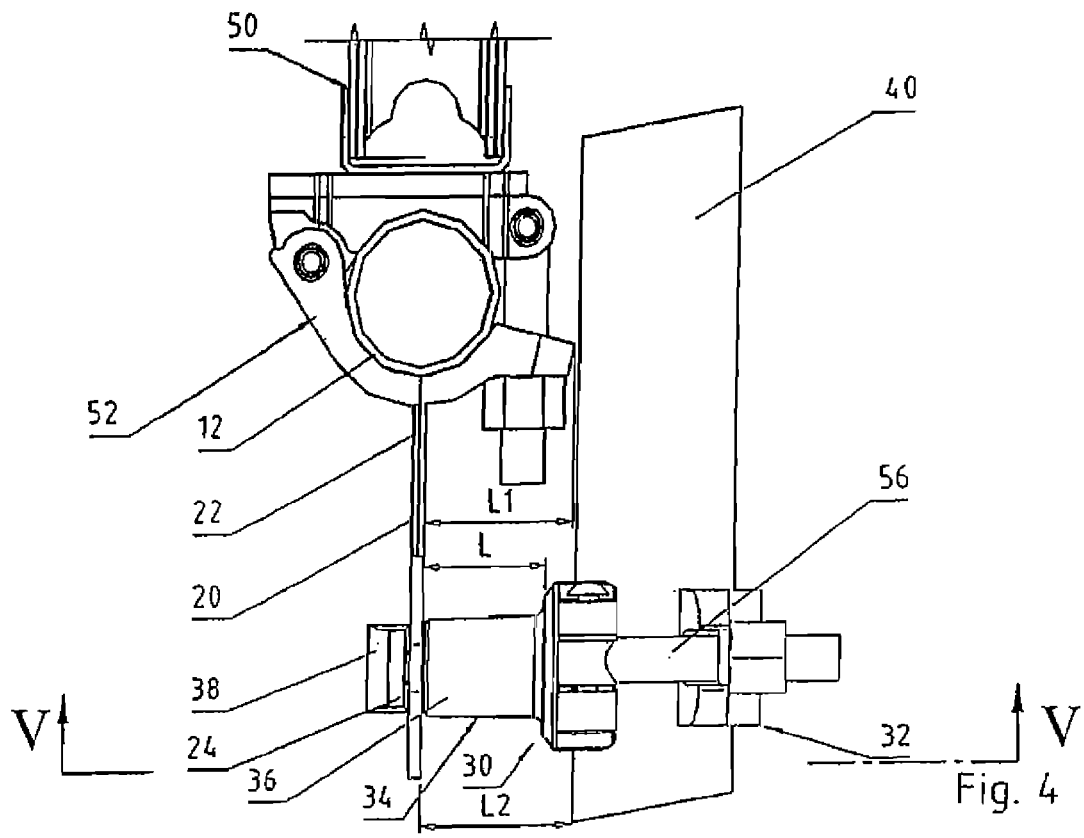
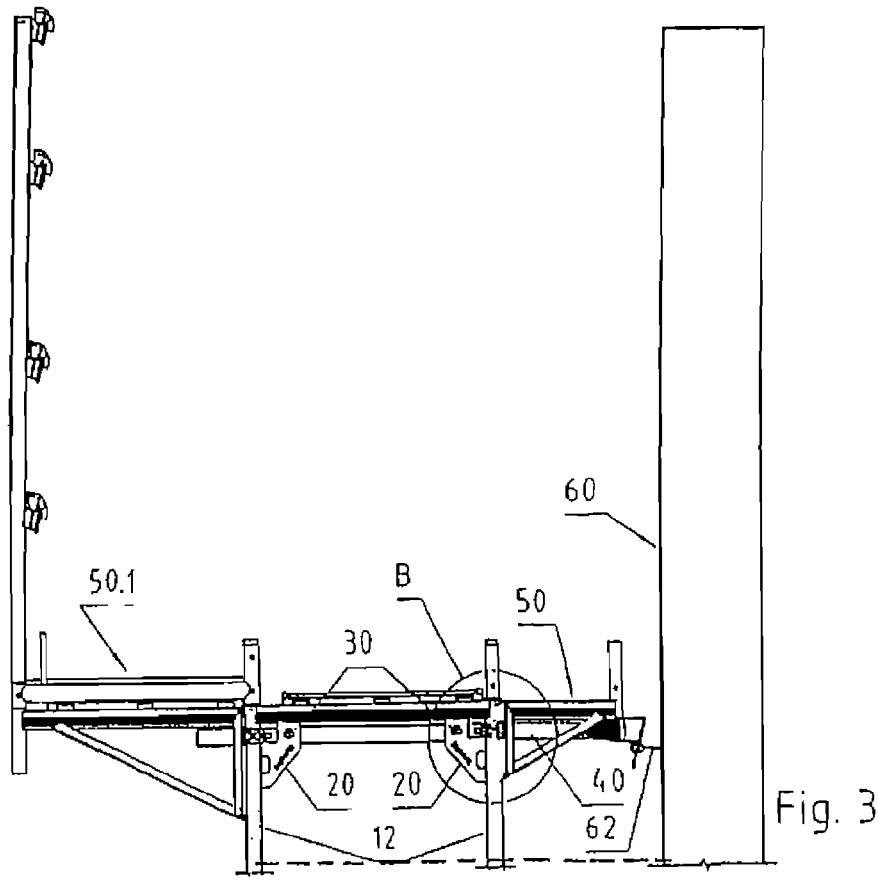

CONNECTING CONSTRUCTION FOR COMPONENTS OF A SYSTEM FRAME, COUPLING UNIT AND FRAMEWORK

TECHNICAL FIELD

The present application is a continuation of PCT/DE02/00567, filed Feb. 19, 2002 and claims the benefit of German Patent Application No. 201 03 131,0, filed Feb. 22, 2001 and German Patent Application No. 101 12 372.8, filed Mar. 15, 2001.

The present invention relates to a connecting construction for components of a system frame, having frameworks which have frame struts and cross brackets connecting the frame struts, a sheet steel corner plate which is arranged in each case in the region in which the cross bracket is connected to the frame strut and which has a corner recess in the corner region of the region in which the cross bracket is connected to the frame strut, by means of which a coupling unit and/or a diagonal brace can be connected to the frame strut.

The present invention furthermore relates to a coupling unit and to a framework for a connecting construction of this type.

PRIOR ART

The Layher speedy frame system which has been known for decades and is well-established is familiar. Use is made in this of a framework of the above-described type, it being possible, for example, for a diagonal frame brace to be connected in the corner recess with a positive fit or it being possible for a coupling unit to be passed through and connected to the frame strut for the purpose of connecting a further frame system element, in particular a frame tube.

In order to ensure that a frame is stable, the latter has to be anchored at predetermined distances to the building in accordance with current regulations. For this purpose, use is made of an anchoring tube which is fastened to the framework and has, in its free end region facing the building, a connecting element which is anchored in a wall anchor fastened to the building. In practice, the problem frequently occurs that at the location at which a wall anchorage is to be provided, a bracket device is already connected to the frame on both sides of the frame via a respective coupling unit guided through the corner recess, with the result that there is no further connecting possibility for the anchoring tube in the region of the sheet steel corner plates. Such anchoring tubes are therefore frequently connected to the frame struts of the vertical frame below the brackets, which significantly reduces the headroom. However, the decrease in the headroom at some points involves inconvenience for the people working on the frame and requires more caution to be used. If care is not taken, there is the risk of serious head injuries.

In order to be able to anchor the anchoring tube for the wall anchor as close as possible to the cross bracket, special couplings which are not optimum in terms of the introduction of force and the outlay on installation have been developed. It is precisely in this region of the anchorage that it is particularly important for the forces which occur to be introduced as far as possible into the supporting-system dimensions of the frame.

SUMMARY OF THE INVENTION

The present invention is based on the object and on the technical problem of specifying a connecting construction of the type mentioned at the beginning which, while retaining the design features and geometries, expands the connecting possibilities in the sheet steel corner plate, and which retains the simple removal and installation while ensuring the supporting of high loads. In this case, a simple wall anchor connection is to be made possible without substantially impairing the headroom between two zones of the frame. The invention is furthermore based on the object and the technical problem of specifying a coupling unit and a framework which permits the relocation of the connecting construction in the region of the sheet steel corner plate in a simple manner.

The novel construction according to the invention is given by the features described below. Advantageous refinements and developments are also described.

The coupling unit and the framework according to the invention are also described.

The connecting construction according to the invention is accordingly distinguished in that a further recess is provided approximately level with the corner recess and offset inward, and a further coupling unit having a first coupling element and a second coupling element is provided, it being possible for a frame tube to be connected to the first coupling element, and the second coupling element being designed in such a manner that it can be fastened in the further recess of the sheet steel corner plate with a positive and/or non-positive fit.

A particularly preferred refinement of the connecting construction according to the invention is distinguished in that the second coupling element has a spacer profile and a projecting profile arranged on the free end side of the spacer profile, it being possible for said projecting profile to be connected or said projecting profile is connected in the further recess of the sheet steel corner plate with a positive and/or non-positive fit.

A design variant which can be handled particularly simply in terms of installation and which can also be produced economically in terms of manufacturing is characterized in that the projecting profile is designed as a hammer head and the further recess is designed as a slot in such a manner that in order to connect the further coupling unit to the sheet steel corner plate, the projecting profile can be introduced into the further recess as far as the stop of the spacer profile and the positive and/or non-positive connection is produced by rotation of the further coupling unit by said rotation causing the hammer head of the projecting profile to engage at least in some areas behind the sheet steel corner plate.

The slot of the further recess may be arranged, for example, vertically upright or lying horizontally.

The further recess is preferably provided at a distance from the lower edge of the cross bracket in order to provide sufficient space for the further coupling unit which is to be connected.

In order to ensure the connection of standardized frame tubes, the first coupling element of the coupling unit is designed as a tube half-coupling.

A particularly economical production, which at the same time ensures permanently reliable functioning in severe installation conditions, is distinguished in that the further coupling unit is designed as a single-piece cast part, in particular a metal cast part.

In order to provide connecting possibilities for a continuous frame tube or similar components, in a situation in which the corner recess is already covered by a coupling unit, a connecting construction according to the invention is designed in an alternative embodiment in such a manner that the length of the projecting profile is selected in such a manner that the clear distance of a frame tube, which is connected parallel to the cross bracket in the first coupling element of the further coupling unit, from the sheet steel corner plate is greater than the length of the maximum projecting length relative to the sheet steel corner plate of a coupling unit arranged in the corner recess.

A particularly preferred development is distinguished in that a rotation prevention unit is provided which secures the further coupling unit against rotation in a position in which it is connected to the sheet steel corner plate.

In order to increase the stability of the sheet steel corner plate transversely with respect to its plane, a cross-sectional deformation pointing out of the plane of the sheet steel corner plate is preferably provided in the region of the further recess of the sheet steel corner plate and is preferably provided encircling the further recess.

A particularly preferred variant embodiment which is to be seen as an alternative independently of the above-described construction or else is to be used in combination and which further increases the connecting possibility in the sheet steel corner plate in terms of variability and number, is distinguished in that an additional recess is provided below the corner recess of the sheet steel corner plate, by means of which an additional coupling unit can be connected or is connected to the frame strut.

With regard to economical production, it is particularly advantageous to design this connecting construction in such a manner that the additional recess on the sheet steel corner plate is formed by a U-shaped recess which is open toward the longitudinal connecting edge of the sheet steel corner plate.

A particularly advantageous refinement of the connecting construction according to the invention which has the effect of dispensing with an additional rotation prevention means, is characterized in that a further coupling unit is connected in each case in the further recess to the two sheet steel corner plates of a frame strut, and the coupling units are connected to a continuous frame tube.

The coupling unit according to the invention for a frame system, in particular for use in a connecting construction according to the above-described type, is distinguished in that the coupling unit is provided with a first coupling element and a second coupling element, it being possible for a frame tube to be connected to the first coupling element, and the second coupling element being designed in such a manner that it can be fastened in the further recess of a sheet steel corner plate with a positive and/or non-positive fit, said coupling unit being designed in a preferred variant embodiment in such a manner that the second coupling element has a spacer profile and a projecting profile arranged on the free end side of the spacer profile, it being possible for said projecting profile to be connected or said projecting profile is connected into the further recess of the sheet steel corner plate with a positive and/or non-positive fit.

The coupling unit is preferably designed in such a manner that the projecting profile is designed as a hammer head and the further recess is designed as a slot, in such a manner that, in order to connect the further coupling unit to the sheet steel corner plate, the projecting profile can be introduced into the further recess as far as the stop of the spacer profile and the positive and/or non-positive connection is produced by rotation of the coupling unit by said rotation causing the hammer head of the projecting profile to engage at least in some areas behind the sheet steel corner plate.

The framework according to the invention for a frame system which is suitable for use within a connecting construction for components of a system frame of the abovementioned type is distinguished in that a further recess is provided in the sheet steel corner plate approximately level with the corner recess of the sheet steel corner plate and offset inward, said recess being used as a connection for a further coupling unit, a preferred development being distinguished in that an additional recess is provided in the sheet steel corner plate below the corner recess of the sheet steel corner plate, by means of which an additional coupling unit can be connected to the frame strut.

Further embodiments and advantages of the invention arise through the features further mentioned in the claims and also through the exemplary embodiments given below. The features of the claims may be combined with one another in any desired manner, insofar as they are not obviously mutually exclusive.

BRIEF DESCRIPTION OF THE DRAWING

The invention and advantageous embodiments and developments thereof are described and explained in more detail in the following text with reference to the examples illustrated in the drawing. The features which can be gathered from the description and from the drawing can be used according to the invention individually by themselves or several of them can be used in any desired combination. In the drawing:

FIG. 3 shows a part of a schematic side view of a frame with a connection to a wall of a building by means of an anchoring tube with the bracket device connected at the same time, FIG. 4 shows a schematic plan view in accordance with detail B in FIG. 3 of the connecting region of the anchoring tube and the bracket device in the region of the sheet steel corner plate of the framework with the frame coverings which have been placed on it having been cut away.

WAYS OF IMPLEMENTING THE INVENTION

Figure 1:
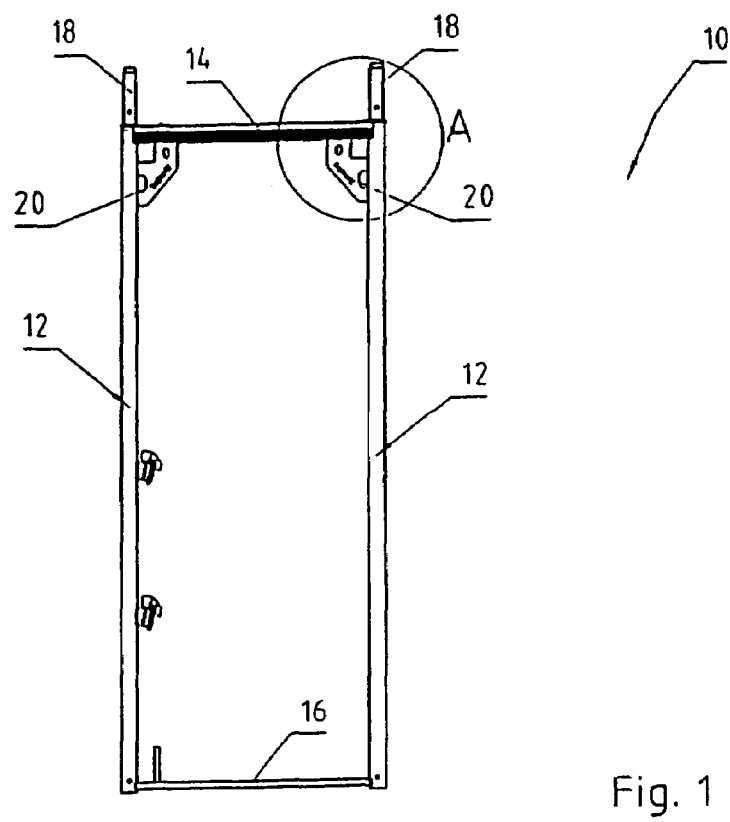
FIG. 1 shows a schematic view of a framework having sheet steel corner plates each with a further recess and an additional recess.

FIG. 1 illustrates a framework 10 which corresponds in its basic design to the framework of the known Layher speedy frame system. The framework 10 has two vertical frame struts or vertical struts 12 which are spaced apart in parallel and, in the upper end region, can be fitted in the coverings via a cross bracket 14, and are connected in its lower end region via a crossbar 16 in the manner of a frame. In the upper end region, there is, protruding above the cross bracket 14, a region 18 on each frame strut 12 with a reduced cross section with respect to the frame strut 12, said region being referred to as the tube connector. This enables a further framework 10 to be attached in each case.

Figure 2:
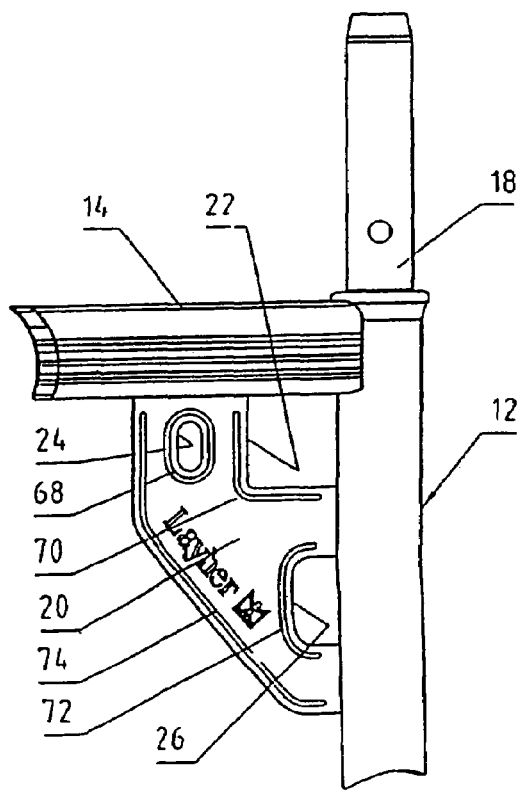
FIG. 2 shows a schematic view of the detail A according to FIG. 1.

A sheet steel corner plate 20, which is illustrated in greater detail in FIG. 2, is welded in each case in the corner region of the connection of the cross bracket 14 to the vertical strut 12. The sheet steel corner plate 20 has a corner recess 22, a further recess 24, which is arranged approximately level with the corner recess and offset inward and is designed as an upright slot, and, below the corner recess 22, an additional recess 26 which is designed as a U-shaped cutout of the sheet steel corner plate 20—as seen from the connecting edge toward the vertical strut 12.

Figure 9:
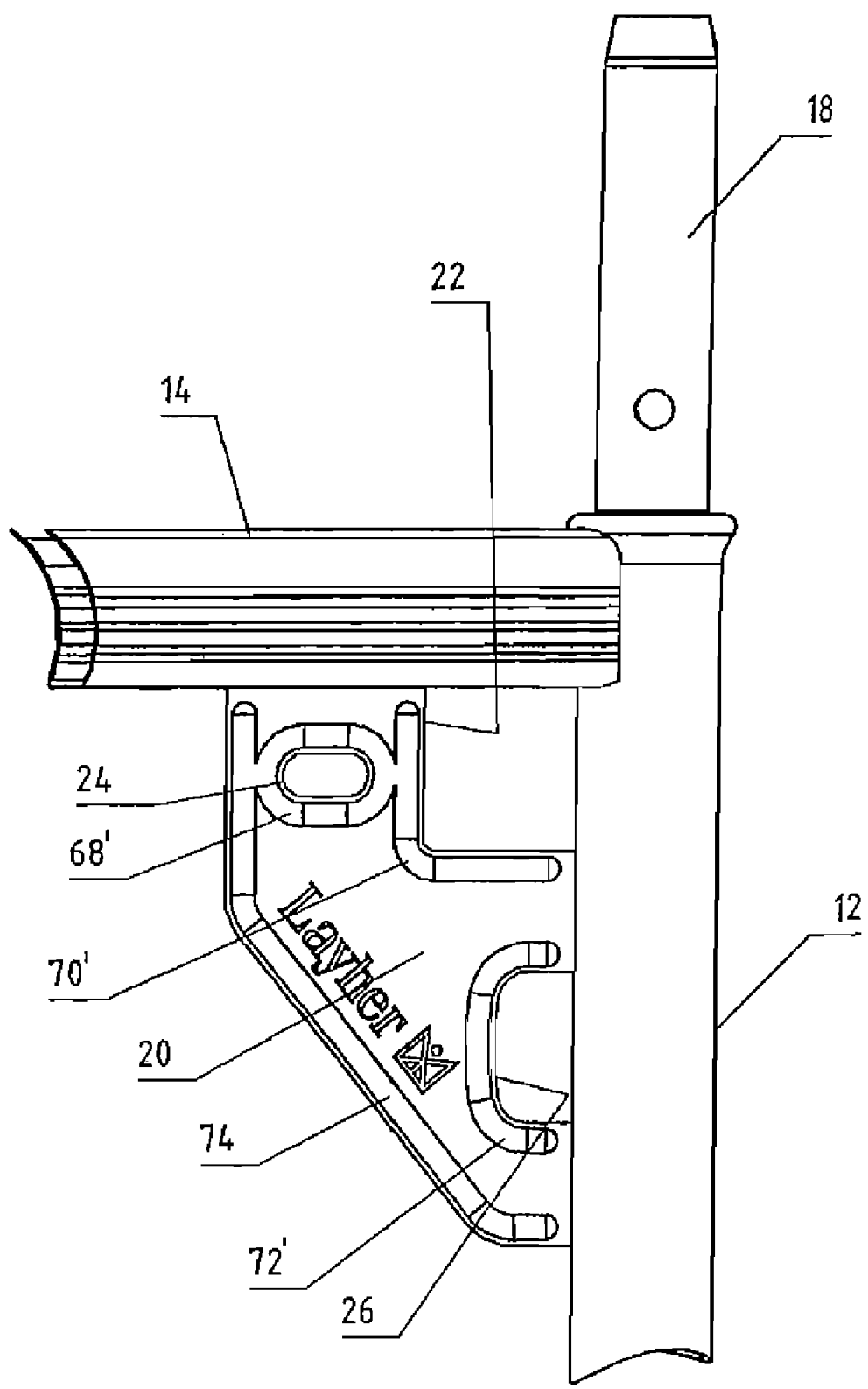
FIG. 9 shows a schematic view of a framework having sheet steel corner plates, according to another embodiment of the present invention.

A cross-section deformation 68 (68' as illustrated in discontinuous form in FIG. 9) which points out of the plane of the sheet steel corner plate 20 is formed around the recess 24 encircling it in the edge region and increases the rigidity perpendicular with respect to the plane of the sheet steel corner plate 20. A cross-section deformation 70 (70' as illustrated in discontinuous form in FIG. 9), which is provided in an L-shaped manner in the edge region of the corner recess 22, is used for the same purpose. The additional recess 26 is also surrounded in its edge region by a U-shaped cross-section deformation 72 (72' as illustrated in discontinuous form in FIG. 9). In order to further increase the stability against buckling, finally a cross-section deformation 74 is likewise provided on the free edge of the sheet steel corner plate 20.

The known corner recess 22 is designed in such a manner that a coupling element can be guided through it and fastened to the vertical strut 12. As an alternative, it is possible for a diagonal brace to be anchored in the corner recess 22 with a positive fit, as is the case in the known Layher speedy frame system.

The further recess 24 and the additional recess 26 provide connecting possibilities for coupling units in order to be able to connect further frame components compactly in the region of the sheet steel corner plate.

Figure 5:
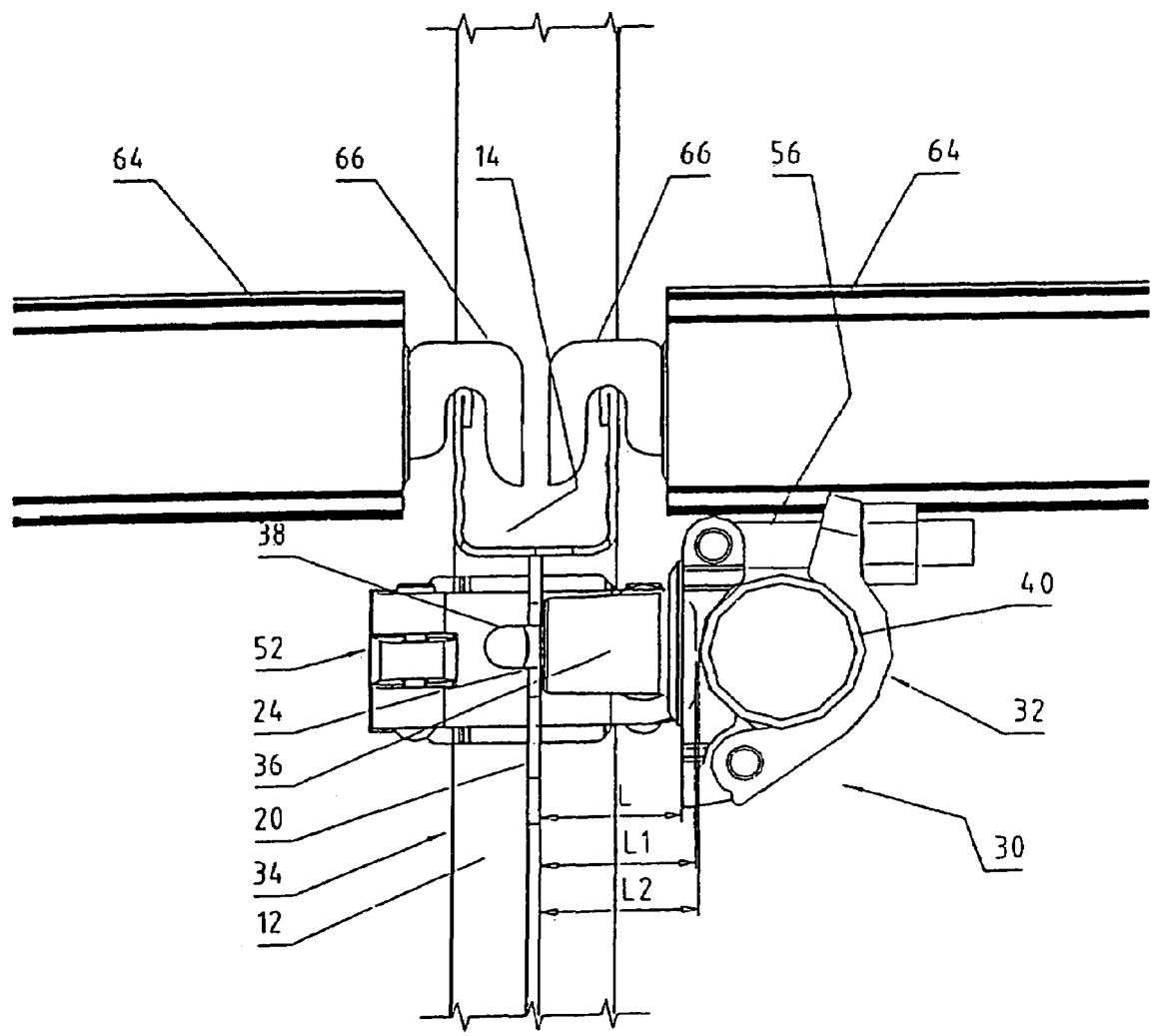
FIG. 5 shows a schematic section through the connecting construction according to FIG. 4 along the section line I-I.

For reasons to do with stability, the frame or the vertical frames 10 has or have to be anchored to a building which is to be scaffolded. Such a situation is illustrated schematically in part in figure 3. In this case, the situation is that two bracket supports 50, 50.1 which protrude outward or inward are already connected in each case to the sheet steel corner plate 20, the connection taking place via a half-coupling or first coupling unit 52 which is guided through the corner recess 22 (FIGS. 4 and 5). As a result, in the previous sheet steel corner plates, a further connection was no longer possible. Therefore, in practice an anchor which is to be provided for anchorage purposes was connected to the vertical struts 12 below the bracket, which is illustrated by dashed lines in FIG. 3. This lower arrangement of the frame tube 40 reduces the headroom, which obstructs the people working on the frame and if care is not taken may result in head injuries.

The construction according to the invention makes it possible for a frame tube 40, which is connected at its protruding end region to a wall anchor 62 anchored in the building 60, to be able to be passed through directly in the region of the cross bracket 14 and parallel thereto and to be able to be connected to both sheet steel corner plates in a simple manner via special, further coupling units or second coupling units 30, as will be described in the following text. As a result, headroom of, for example, 1.95 m (meters) which is required in the regulations can easily be maintained.

The further coupling unit 30 is illustrated in greater detail in FIGS. 4 and 5. The FIGS. 4 and 5 present the connecting construction, which is referred to in FIG. 3 as detail B.

As already mentioned, a half-coupling 52 is guided through the corner recess 22 and is connected to the frame strut 12 and connects the protruding bracket support 50.

The further coupling unit 30 has a first coupling element 32 which is designed as a half-coupling 52 and can be connected in a simple, known manner to the anchoring tube 40 by pivoting of the element 32 with an anchoring screw 56 subsequently being inserted and tightened. A second coupling element 34 is integrally formed on the first coupling element 32 and has a spacer profile 36 which is circular in cross section and on the end side of which a projecting profile 38, which is designed as a hammer head element, is integrally formed. The further coupling unit 30 is preferably designed as a cast part. The hammer head of the projecting profile 38 is designed with respect to its geometry in such a manner that it can be introduced in a rotated installation position into the slot-shaped recess 24. The further coupling unit 30 is introduced until the end side of the spacer profile 36 rests on the outside of the sheet steel corner plate 20. The further coupling unit 30 is then rotated through 90° (degrees), so that the hammer head of the projecting profile 38 engages behind the wall of the sheet steel corner plate. This ensures that the further coupling unit 30 is connected to the sheet steel corner plate 20 with a positive fit. The anchoring tube 40 can then be connected in a simple manner via the first coupling element 32. The length L of the spacer profile 36 is selected in such a manner that the clear distance L2 of the fitted anchoring tube 40 from the outside of the sheet steel corner plate 20 is greater than the length L1 of that part of the half-coupling 52 which protrudes beyond the sheet steel corner plate 20. As a result, the anchoring tube 40 can be easily guided past the half-coupling 52 and all in all connected at a height which ensures the required headroom of 1.95 m (meters). This connecting construction also has static advantages since the forces are introduced very close to the axes of the supporting frame strut 10.

Owing to the fact that the anchoring tube 40 is connected to the two sheet steel corner plates 20 of the frame strut 10 via the further coupling unit 30, the further coupling units 30 are automatically secured against rotation when the anchoring tube 40 is connected.

In the illustration according to FIGS. 4 and 5, the further coupling unit 30 is arranged in such a manner that the anchoring screw 56 of the first coupling element 32 is provided on the upper side, i.e. just below the covering 64 which is hooked into the cross bracket 14, which is designed as an upwardly open U profile, via hook claws 66. However, it is also possible to fit the further coupling unit 30 rotated through 180° (degrees), i.e. the anchoring screw 56 is provided on the lower side in this case. An installation position of this type is given, for example, if a passage step element is arranged in the region of the connecting construction and the arrangement of the anchoring screw 56 on the lower side therefore brings easier accessibility in terms of installation.

Figure 6:
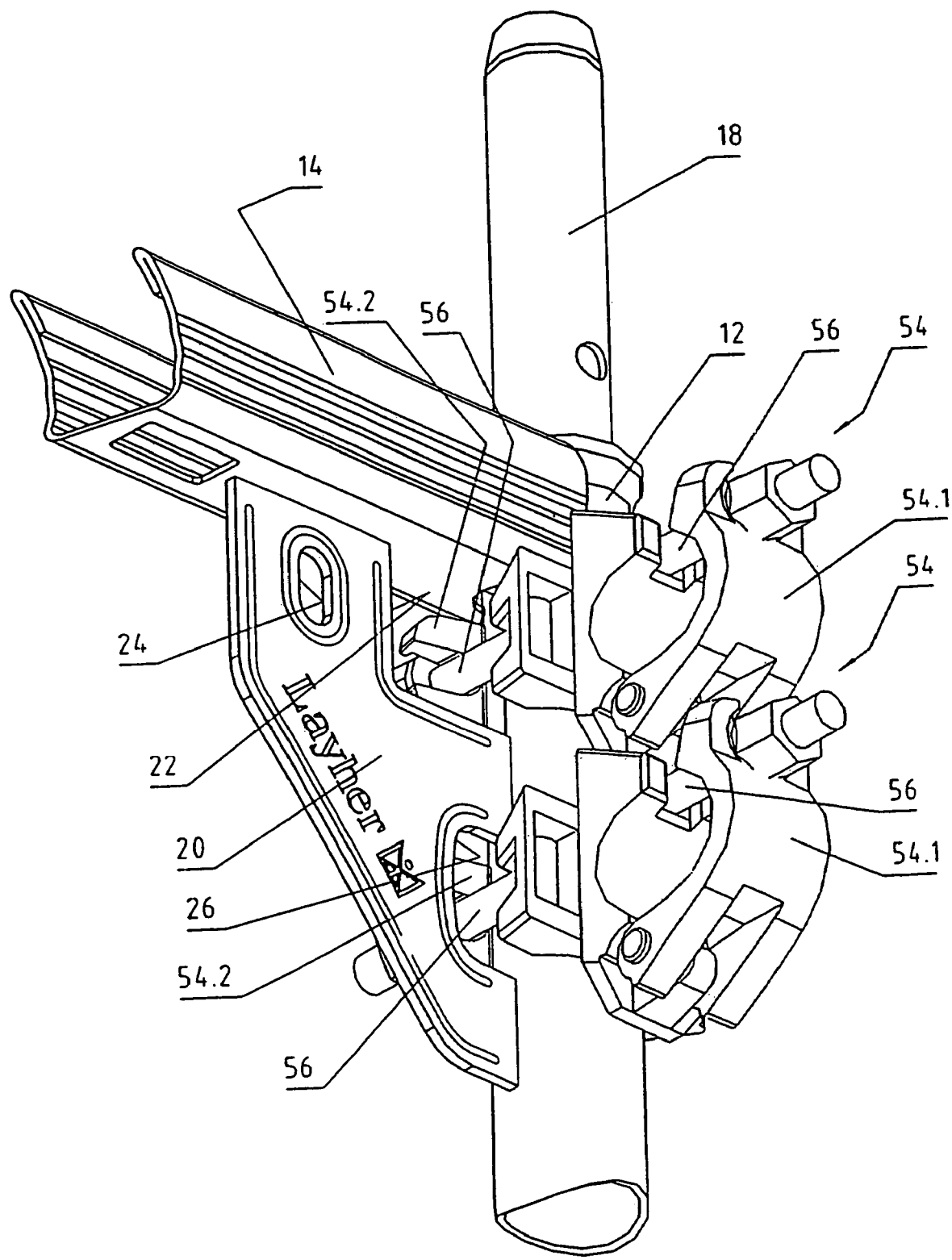
FIG. 6 shows a schematic perspective of a detail of the connection of a normal coupling unit in the region of the corner recess and of an additional normal coupling unit in the region of the additional recess.

FIG. 6 schematically shows the compact connecting possibility for an additional coupling unit 54 in the region of the sheet steel corner plate 20. According to FIG. 6, a normal coupling 54 having a first coupling element 54.1 and a second coupling element 54.2 is already provided in the corner recess. The second coupling element 54.2 is guided through the corner recess 22 and connected to the vertical strut 12. A further frame tube can then be connected to the first coupling element 54.1.

The additional coupling unit 54 with its coupling elements 54.1 and 54.2 is provided directly below. The second coupling element 54.2 is guided through the additional recess 54 and connected to the vertical strut 12. The first coupling element 54.1 provides a further connecting possibility for a further frame tube.

Figure 8:
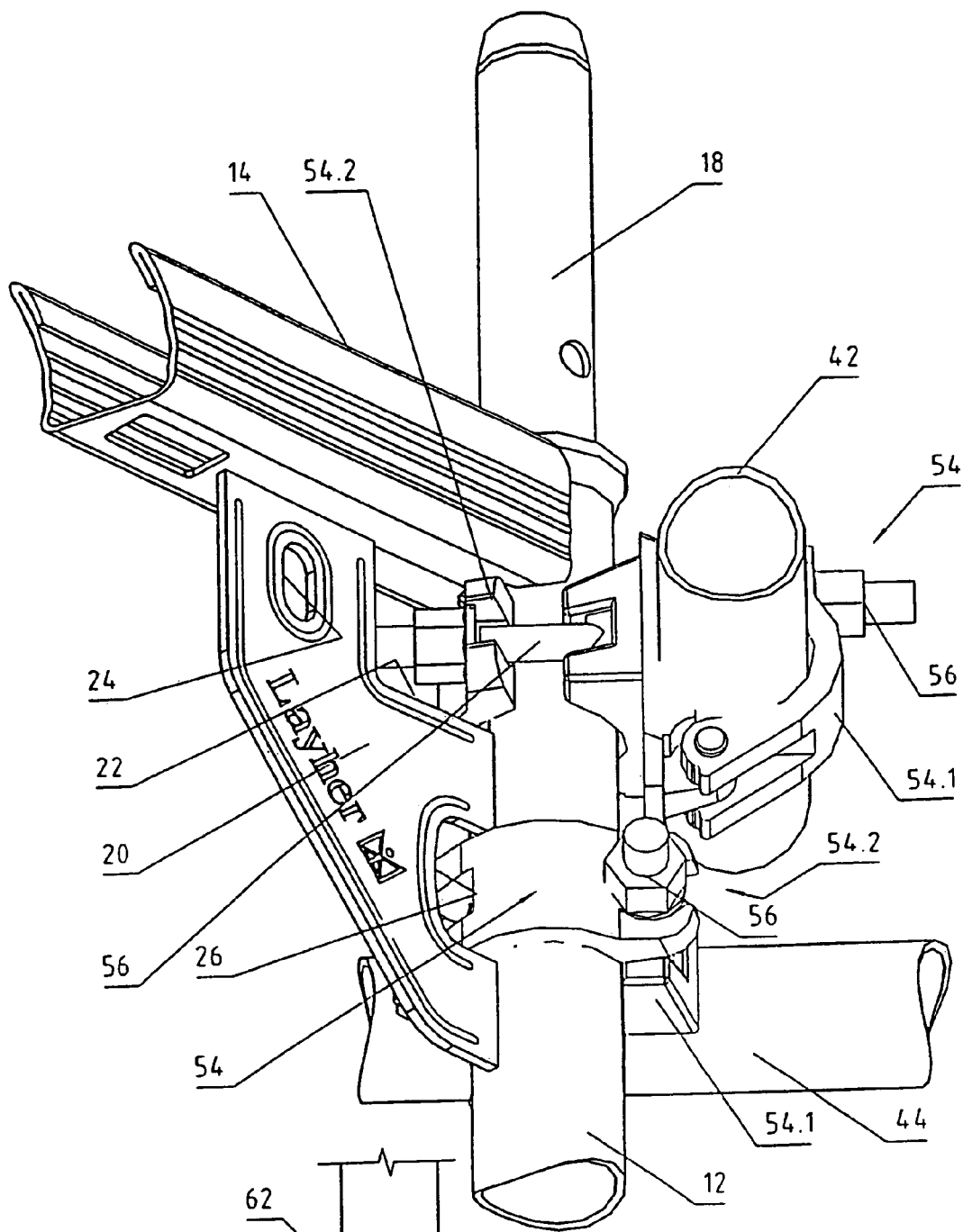
FIG. 8 shows a schematic perspective of a detail of the frame elements of the V-shaped wall anchorage according to FIG. 7 in the region of the sheet steel corner plate of a framework.
Figure 7:
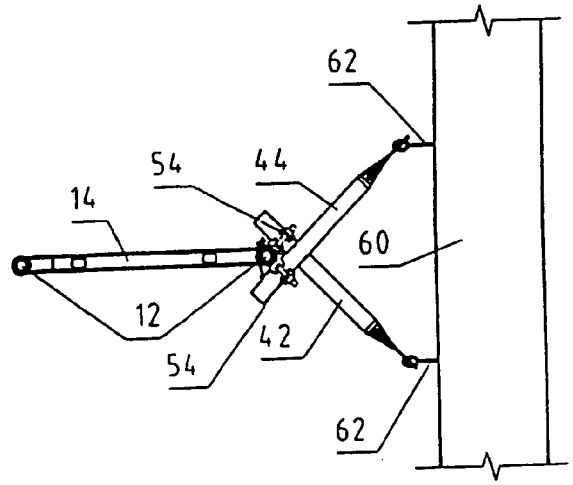
FIG. 7 shows part of a schematic plan view of the connection of a frame to a building via anchoring tubes arranged in a V-shaped manner.

A practical application is illustrated in FIGS. 7 and 8. This also in turn involves the frame being anchored to a building 60. In the exemplary embodiment illustrated, a "V anchorage" is used. Use is made in this case of a first anchoring tube 42 and a second anchoring tube 44 which are of V-shaped design as seen in the plan view according to FIG. 7 in which case the point of the V is to be connected in the region of the sheet steel corner plate and the opposite end regions of the anchoring tubes 42, 44 are fastened to the building 60 via a wall anchor 62. As can be seen from FIG. 8, it is easily possible to connect the anchoring tubes 42 and 44 in the region of the sheet steel corner plate 20 to the vertical strut 12 in a compact manner. The angle formed by the two anchoring tubes 42 and 44 can easily be varied.

The invention claimed is:

1. A connecting construction for components of a system frame, comprising:
    a framework having frame struts and a cross bracket connecting the frame struts,
    a sheet steel corner plate which is arranged in each corner region in which the cross bracket is connected to the frame struts and which has a corner recess in the corner region of the plate in which the cross bracket is connected to the frame struts,
    a coupling unit that is connectable to one of the frame struts via the sheet steel corner plate,
    a further recess in the sheet steel corner plate approximately level with the corner recess and offset inward,
    a further coupling unit having a first coupling element and a second coupling element,
    wherein the first coupling element is connectable to a frame tube,
    wherein the second coupling element is fastenable in the further recess of the sheet steel corner plate with one of a positive and non-positive fit, and has a spacer profile and a projecting profile arranged on the free end side of the spacer profile, said projecting profile being connectable in the further recess of the sheet steel corner plate with one of a positive and non-positive fit.

2. The connecting construction as claimed in claim 1, the projecting profile is a hammer head and the further recess is a slot so that in order to connect the further coupling unit to the sheet steel corner plate, the projecting profile can be introduced into the further recess as far as a stop of the spacer profile and the one of a positive and non-positive fit is produced by rotation of the further coupling unit by said rotation causing the hammer head of the projecting profile to engage at least in some area behind the sheet steel corner plate.

3. The connecting construction as claimed in claim 2, wherein the slot is arranged vertically upright.

4. The connecting construction as claimed in claim 2, wherein the slot is arranged horizontally.

5. A coupling apparatus for a frame system, comprising a framework having frame struts and a cross bracket connecting the frame struts, a sheet steel corner plate which is arranged in each corner the region in which the cross bracket is connected to the frame struts and which has a corner recess in the corner region of the plate in which the cross bracket is connected to the frame struts, and a further recess in the sheet steel corner plate approximately level with the corner recess and offset inward, the coupling apparatus further comprising:
    first and second coupling units, the first coupling unit being connectable to one of the frame struts via the sheet steel corner plate, and the second coupling unit being provided with a first coupling element and a second coupling element; and
    a frame tube that is connectable to the first coupling element, wherein the second coupling element is fastenable in the further recess of the sheet steel corner plate with one of a positive and non-positive fit, and the second coupling element has a spacer profile and a projecting profile arranged on the free end side of the spacer profile, said projecting profile being connectable into the further recess of the sheet steel corner plate with one of a positive and non-positive fit.

6. The coupling apparatus as claimed in claim 5, wherein the projecting profile is a hammer head so that, in order to connect the second coupling unit to the sheet steel corner plate, the projecting profile can be introduced into the further recess as far as the stop of the spacer profile and the one of a positive and non-positive fit is produced by rotation of the first coupling unit by said rotation causing the hammer head of the projecting profile to engage at least in some area behind the sheet steel corner plate.

7. The coupling unit as claimed in claim 5, characterized in that
    the length of the spacer profile is selected in such a manner that a clear distance of the frame tube, which is connected parallel to the cross bracket in the first coupling element of the second coupling unit, from the sheet steel corner plate is greater than a the maximum projecting length, relative to the sheet steel corner plate, of the first coupling unit arranged in the corner recess.

8. A coupling apparatus for a frame system in a scaffolding, comprising a framework having frame struts and a cross bracket connecting the frame struts, a sheet steel corner plate which is arranged in each corner region in which the cross bracket is connected to the frame struts and which has a corner recess in the corner region of the plate in which the cross bracket is connected to one of the frame struts, and a further recess in the sheet steel corner plate approximately level with the corner recess and offset inward, the coupling apparatus further comprising:
    first and second coupling units, wherein the first coupling unit is connectable to one of the frame struts via the sheet steel corner plate, and the second coupling unit is provided with a first coupling element and a second coupling element;
    a frame tube that is connectable to the first coupling element, wherein the second coupling element is fastenable in the further recess of the sheet steel corner plate with one of a positive and non-positive fit; and
    wherein the length of a spacer profile of the second coupling element is selected in such a manner that a clear distance of the frame tube, which is connected parallel to the cross bracket in the first coupling element of the second coupling unit, from the sheet steel corner plate is greater than a maximum projecting length, relative to the sheet steel corner plate, of the first coupling unit arranged in the corner recess.

9. The coupling apparatus as claimed in claim 8, wherein the first coupling element of the second coupling unit is a tube half-coupling.

* * * * *

UNITED STATES PATENT AND TRADEMARK OFFICE
CERTIFICATE OF CORRECTION

| | |
|---|---|
| PATENT NO. | : 7,413,365 B2 |
| APPLICATION NO. | : 10/622935 |
| DATED | : August 19, 2008 |
| INVENTOR(S) | : Helmut Kreller |

Page 1 of 1

It is certified that error appears in the above-identified patent and that said Letters Patent is hereby corrected as shown below:

On the Title page item (73), Remove "Wilhelm Layher Vermögensverwaltungs-GmbH, Guglingen-Eibensback (DE)" and insert -- Wilhelm Layher Verwaltungs-GmbH, Guglingen-Eibensback (DE) --

Signed and Sealed this

Seventh Day of April, 2009

JOHN DOLL
*Acting Director of the United States Patent and Trademark Office*